United States Patent [19]

Cordi et al.

[11] 4,077,059
[45] Feb. 28, 1978

[54] MULTI-PROCESSING SYSTEM WITH A HIERARCHIAL MEMORY HAVING JOURNALING AND COPYBACK

[76] Inventors: Vincent A. Cordi, 400 Fordham Road, Vestal, N.Y. 13850; Bruce A. Edson, 16 Woodside Road East Apalachin, N.Y. 13732

[21] Appl. No.: 642,035

[22] Filed: Dec. 18, 1975

[51] Int. Cl.² ............................................. G06F 13/08
[52] U.S. Cl. .................................................. 364/200
[58] Field of Search .......................... 340/172.5; 445/1; 364/200, 200 MS

[56] References Cited

U.S. PATENT DOCUMENTS

| | | | |
|---|---|---|---|
| 3,685,020 | 8/1972 | Meade | 340/172.5 |
| 3,737,864 | 6/1973 | Werner | 340/172.5 |
| 3,737,871 | 6/1973 | Katzman | 340/172.5 |
| 3,916,387 | 10/1975 | Woodrum | 340/172.5 |
| 3,921,141 | 11/1975 | Wilbur et al. | 340/172.5 |

Primary Examiner—Harvey E. Springborn
Attorney, Agent, or Firm—James E. Murray

[57] ABSTRACT

This is a hierarchial memory system for a multi-processing system which has two or more processing units accessing the memory system. The memory system has two different types of memory units on each level. One of the types of units is called the data store (DS) and contains all the data at that level of the memory. The other type of unit is called the copy back data store (CBDS) and contains all the changes that have been made which changes data either by addition or modification and that are to be copied back to the next lower level of the memory hierarchy. The data store and the copy back data store in each level are on two different power systems and transfers of the changes to the next lower level are done in the order in which the change entered in the copy back store with the oldest entry being the first to be copied back. Each copy back data store has a capacity which is only a small portion of the data capable of being stored in the corresponding data store. To prevent overruns from occurring when the number of data units to be copied back exceeds the capacity of the copyback store, an up/down counter keeps track of the difference between the number of items to be copied back and those already copied back and notifies the system when the copy back data store is about to overflow.

4 Claims, 8 Drawing Figures

MULTI-PROCESSING SYSTEM WITH A HIERARCHIAL MEMORY HAVING JOURNALING AND COPYBACK

BACKGROUND OF THE INVENTION

The present invention relates to memories and more particularly to hierarchial memories.

Hierarchial memories using monolithic storage elements at the higher levels have resulted in faster and more economical memory systems. However, such memories are not without drawbacks. In particular, hierarchial systems have significant communication problems between the levels of the hierarchy and the volatile monolithic memories in the higher levels of the hierarchy have data integrity problems resulting from their reliability and their susceptibility to power supply failures and fluctuations. One solution to the integrity problem would be to have two storage units at each level, each with a duplicate of the data at the level so that if a failure occurred in one store, the data could be reproduced from the other. However, while this improves reliability it does nothing to alleviate the communication problem between the levels and it doubles the number of storage elements needed to form any given level of the memory within increasing the capacity of the memory. Furthermore, in case of a failure requiring or forcing a shut down of the memory the transfer of the duplicated data from the levels of the memory containing the volatile memories to levels containing non-volatile memories in the process of bringing the storage system down would require much more time than is desirable and in fact may be available before the failure results in the destruction of data.

In co-pending appliction Ser. No. 486,043, filed July 5, 1974, now issued into U.S. Pat. No. 4,020,466 data integrity is obtained using new copy back techniques and the communication problem has been simplified by using new copy back algorithms in combination with the new copy back techniques. The new hierarchial memory system has two memory units on each level. One of the units contains all the data at that level of the memory. The other unit contains only the changes that have been made in that data either by addition or modification. While the first or data storage unit is interfaced with the next higher level in the hierarchial memory system or with the processing units for the data processing system, the second or copy back storage unit can transfer the changes made in the data into the next lower level in the memory hierarchy system if the copyback store is free and the main memory unit in the next lower level is not involved in transferring of data up the line. By duplicating only the changed data and copying back the changes to the data at lower levels when the opportunity presents itself, the amount of data that must be moved at the occurrence of a failure is minimized thereby reducing the time required to move the data on failure. Furthermore, the data store and the copy back data store in each level are on two different power systems so that if either power system goes out a complete record of the data is maintained. However, as described in the above-identified patent application, the copy back data store at any given level is as large as the data store at that level. In this respect the copy back technique of the above described application has the same effect on the memory as duplicating all the data at each level. That is, it doubles the number of storage elements on each level of the hierarchy without a resultant increase in the capacity of the memory.

THE INVENTION

Therefore, in accordance with the present invention the capacity of any copy back data store is reduced to a portion of the corresponding data store and a running check is kept on the number of entries in that copy back store that have yet to be copied back. When the number of such entries approaches the capacity of the copy back store, any functions of the memory requiring new entries into that copy back store are halted and the copying back of changes listed in that copy back store becomes the first priority of operation. This continues until the number of uncopied back entries in the copy back data store is reduced to an acceptable level. Co-pending application Ser. No. 642,034, filed on even date herewith covers other features of the following illustrated embodiment of the invention.

Therefore, it is an object of the present invention to provide a new hierarchial memory system for the processing and/or multi-processing systems.

It is another object of the present invention to provide a hierarchial memory system in which data integrity is maintained but which does not involve the complications of straight duplication.

Another object is to provide a hierarchial system that insures data integrity by employing copy back and journaling techniques.

Another aspect of the invention is to provide a new technique for transferring changes in the data down through a hierarchial memory system.

Another object of the invention is to provide a new copy back store mechanism that requires that the copy back store have only a percentage of the capacity of the total store.

The foregoing and other objects, features and advantages of the present invention will be apparent from the following description of a preferred embodiment of the invention as illustrated in the accompanying drawings, of which:

PREFERRED EMBODIMENT OF THE INVENTION

Figure 1:
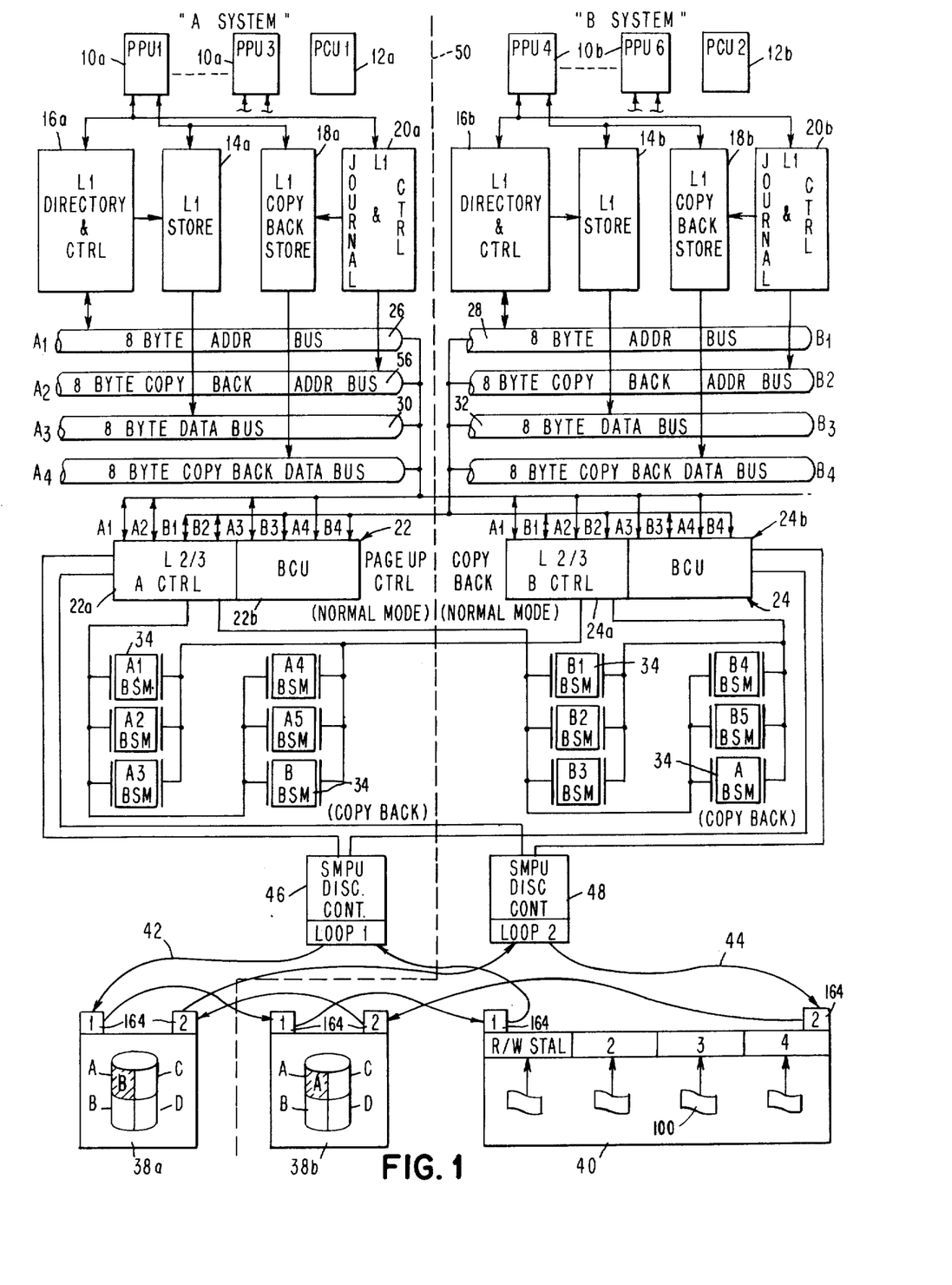
FIG. 1 is a generalized schematic diagram of a hierarchial system employing the present invention.

FIG. 1 shows a multi-processing system with a hierarchial memory employing the present invention. The memory is divided into two halves, providing what is called the "A System" and the "B System". Each memory system is a separate availability axis of the hierarchial memory that is, data is processed and transferred up and down the hierarchy along one availability axis independently of the other availability axis. Furthermore, as shall be explained hereinafter, the A and B systems are individually powered and designed such that loss of all or any part of one does not bring down the other. Each half of the system includes a number of Program Processing Units or PPU's 10 and one Process Control Unit or PCU's 12. Each processor 10 has its own L1 STORE 14 (CACHE) and an associated L1 directory 16 and controller. In addition, at level one, for each processor, there exists a L1 Copy Back Data Store 18 (CBDS) and an L1 Journal and Controller 20. For simplicity of FIG. 1, the L1 Copy Back Store 18 and Journal for PPU 1 are shown adjacent to the cache 14a for PPU 1. However, for reliability and recoverability purposes, the Copy Back Data Store 18 and Journal 20a for any PPU in the A half of the system would be packaged with the PPU's on the B half of the system and vice versa.

As pointed out in copending application Ser. No. 486,043, any change made by a PPU in data stored in its cache is placed into its L1 store and also into the L1 copy back store for its half of the system for the purpose of communicating between the PPU's and a multi level hierarchial memory having three more levels, an L2/3, L4 and L5 level. Data is transferred through the hierarchy from the L5 level to the caches 14 and changes in data are sent back down the hierarchy from the L1 to the L5 level. Details of the structure of each of the L2/3, L4 and L5 levels are contained hereinafter.

For transmission of data between the L1 and L2/L3 levels there are two L2/3 controllers 22 and 24. These are identical in implementation but in normal mode, that is when both are functioning properly, they perform independent tasks. The controller 22 performs the "page up" function. That is, whenever a processor or PPU 10 requires data not in its cache the controller 22 will handle the fetching of the requested data from the appropriate L2/3 Basic Storage Module (BSM) and pass the data up to the requesting processor's cache (L1). In normal mode the address is presented to the L2/3 Controller 22a via the right of left 8-byte address but 26 or 28 while the BCU (Bus Control Unit) 22b transmits the requested data onto the right or left hand 8-byte data bus 30 or 32. Thus, during normal operation the "page up" controller 22 handles the movement of data up the memory hierarchy from the L2/3 level to the L1 level.

As opposed to this, controller 24 handles the movement of data in the opposite direction. The copyback controller 24 as it is called performs the function of copying back new or modified data from the L1 CBDS's 18 to the L2/3 level. While the controllers perform different functions during normal operation in event of failure of one controller each of the controllers can perform the task of both.

At the L2/L3 level there is a division of the memory capacity into storage units called basic storage modules or BSM's 34. BSM's A1, A2, A3, A4, A5 and B are physically packaged together and are in the "A" availability axis of the system while BSM's B1, B2, B3, B4, B5 and A are physically packaged together and are in the "B" availability axis. BSM's A1 thru A5 and B1 to B5 are the home locations of the data that resides at L2/3, while BSM "B" contains all modifications made to data in BSM's B1 thru B5 and BSM "A" contains all modifications made to data in BSM's A1 thru A5.

The last two levels are electro-mechanical devices; that is the L4 level is made up of disc packs 38 while the L5 level is made up of a tape cartridge unit 40. These units are joined together through circuit loops 42 and 44, each unit being joined by the two loops to a different controller 46 or 48 by one of the loops. The disc units are split between the A and B availability axis and while the tape unit is shown in the B availability axis half, one of the stations is controlled through the A availability axis.

With this arrangement the copying of data from the L1 level into the L2/L3 level is performed whenever the data store 14b for the L2/L3 level is free and the processor is not accessing its cache. Then the changed data can be moved from the copy back store of the L1 level to the data store of the L2/L3 level. In like manner the copying back of data on the L2/L3 level into the L4 level is performed while the store on the L2/L3 level is free and so on. The changes in data are copied back in order in which they were entered into the journal 20 with the oldest entry into the journal being copied back first or in other words the data which has been least recently first modified (LRFM) is copied back first when the opportunity to copy back data presents itself. In this way the copying back of data to maintain a data pyramid is made efficiently without interferring with the upward movement of the data in the hierarchy. What is meant by a data pyramid is that the data is allowed at any given level only if a copy of the data exists at a higher level and is copied back to lower levels to form a data pyramid.

Besides being copied back down the hierarchy to maintain the dta pyramid, modified data can be removed from any level or moved back down the hierarchy to make room for new data. Before modified data can be moved back down the hierarchy, it must be what is referred to as "top" or the top position in the data pyramid. That is, the data to be moved down cannot be at any level that is higher in the hierarchy than the level from which it is being removed. The reason for allowing only the top position in the pyramid to be rolled back or to be overlaid is to elimimate holes in the data pyramid since this simlifies the use of the journalizing and copy back techniques of the present invention. Of course unmodified data does not have to be copied back down to make room for new data. It merely has to be overlaid by the new data since a copy of unmodified data already exists at lower levels.

A "power shield" represented by the dotted line 50 that separates the A and B systems is used in combination with the described journalizing and copy back techniques to insure data integrity. What is meant by a power shield is that all the equipment on one side of the dotted line 50 is run off one power supply while all the equipment on the other side of the line 50 is run off another power supply. Furthermore, at least in the L5 level of the memory system the data is duplicated on a non-volatile storage medium such as magnetic tape. Therefore, failure of the power supply for either the A or B system does not destroy the integrity of data since all data is maintained at least on the L5 level in a medium which is immune from such failure and all the changes made in the data stored in the L5 level are contained on both sides of the shield 50 on at least one of the other levels L1 to L4. Therefore the data can be copied back down through hierarchy using the system still having power to update the data base at the L5 level. As a final precaution battery power can be employed in case of failure of power on both system to maintain data in the copy back store and the journal 20 on all levels where the storage medium is volatile and also on all levels to move the data down the data pyramid to a level where the data is stored on a non-volatile medium.

Figure 2:
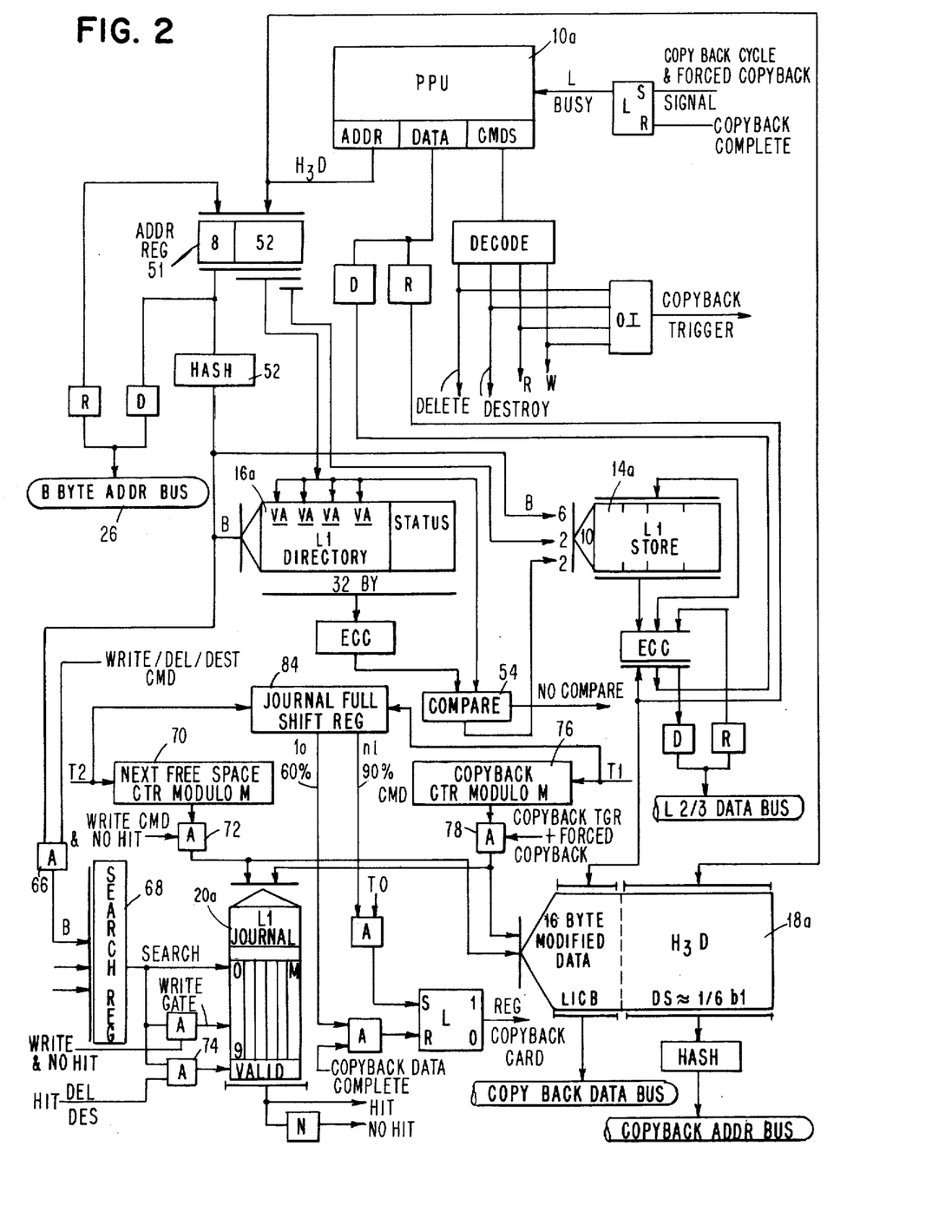
FIG. 2 is a block diagram showing details of the first level of the memory hierarchial system shown in FIG. 1.

The L1 level of the memory hierarchy system shown in FIG. 1 is shown in more detail in FIG. 2. The level L1 directory 16a stores the virtual addresses, in groups of four virtual addresses each, for all data resident in level L1 of the memory system at any given moment. The four addresses in any group are called a congruence class whose address in level L1 is determined by a hashing operation, which involves the Exclusive ORing of certain of virtual address bits with real address bits from the address register 51 in the EXclusive OR circuitry 52 of the type shown in more detail in FIG. 3 of co-pending application Ser. No. 486,043, filed July 5, 1974. This output B of the Exclusive Or circuitry is fed to the decoder input for the directory 16a to access the directory. When the directory is so accessed, four addresses of a congruence class are read out of the directory in parallel. Each of the virtual addresses read out of the directory 16a is compared in a comparator circuit 54 with bits from the virtual address used to generate the B accessing the L1 directory 16a. If any of the addresses read out of the directory 16a matches the requested virtual address, the compare circuit provides an output signal. This output signal consists of two bits indicating which one of the four addresses read out of the directory matches the address searched. This two-bit signal is supplied to a decoder operating on the output of the first level data store 14a. The data store 14a stores all the data in the first level and is addressed through its input decoder by the same hash signal B as the directory 16a, and when it is addressed reads the data at the four virtual addresses in the congruence class. The one-out-of-four two-bit compare signal then selects the data of one of the virtual addresses of its congruence class to be read out into and fed back to the program processing unit 10a in response to the request for data. The other two bits for addressing the L1 store are two address bits from the address register.

Figure 3:
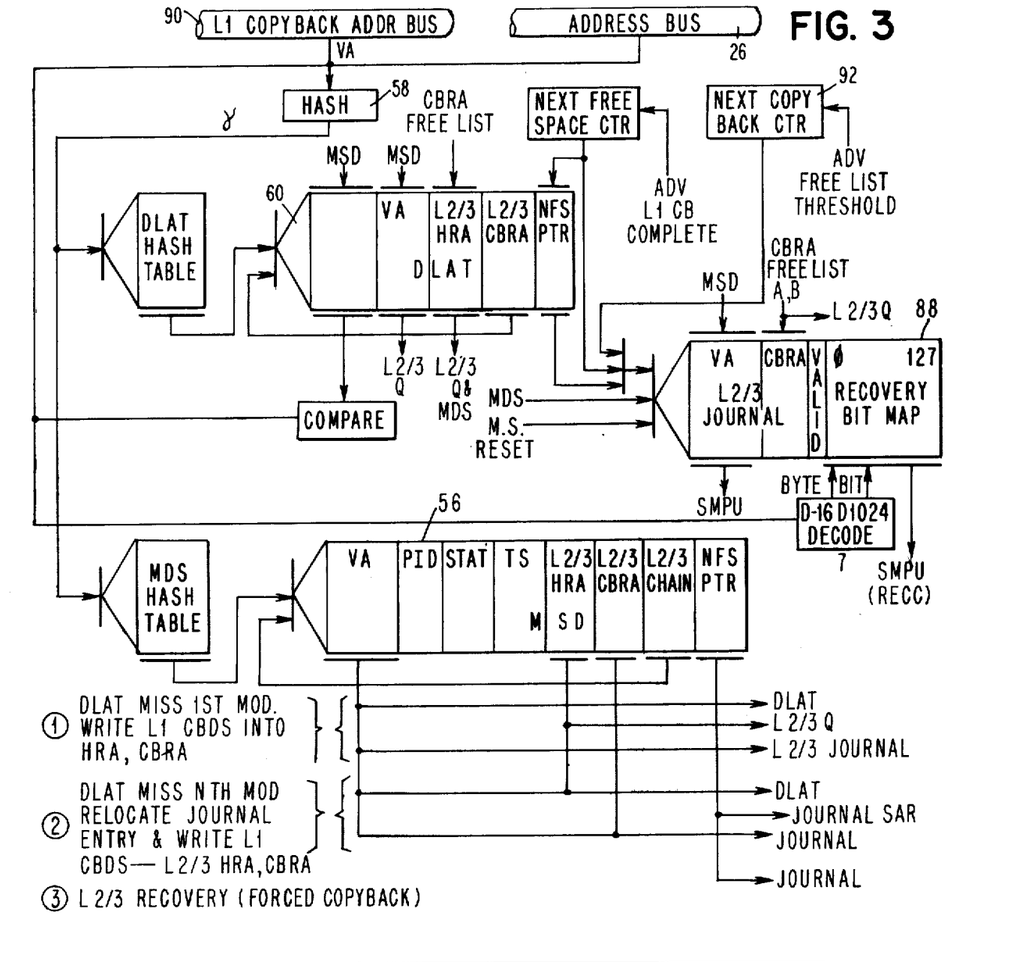
FIG. 3 is a block diagram of the second level of the memory hierarchial system shown in FIG. 1.

If it turns out that the data is not in the first level L1 then the data must be obtained from the second level L2/L3. Therefore the address in the register 51 is transmitted to the address bus 26 for transmission to the L2/L3 storage if the compare circuit 54 provides a no compare output. As shown in FIG. 3 the second level L2/L3 like the first level L1 contains a directory 56. Since the second level stores more data than the first level the directory here must be larger. Thus, the input to this directory is a larger hash signal requiring more bits to select the congruence class of the four virtual addresses. This hash signal γ is also generated by EXclusive OR circuitry 58 such as is shown in co-pending appliction Ser. No. 486,043. The directory 56 is accessed by the hashed signal γ it supplies a real location in storage in the L2/L3 level store where the data can be found. As shall be seen hereinafter the directory is a portion of main memory and therefore is relatively slow. In addition there is a directory lookaside table (DLAT) 60 which operates faster than the directory and contains translations of some of the more recently used virtual address. The DLAT 60 is accessed at the same time as the directory and if the address resides in the DLAT it will be accessed more rapidly. Accessing of a hierarchical memory with a virtual address through a directory is well known and can be found in U.S. Pat. No. 3,781,808 which issued Dec. 25, 1973 to Ahern et al, the title of which is "Virtual Memory System" and is assigned to the same assignee as this application.

Figure 4:
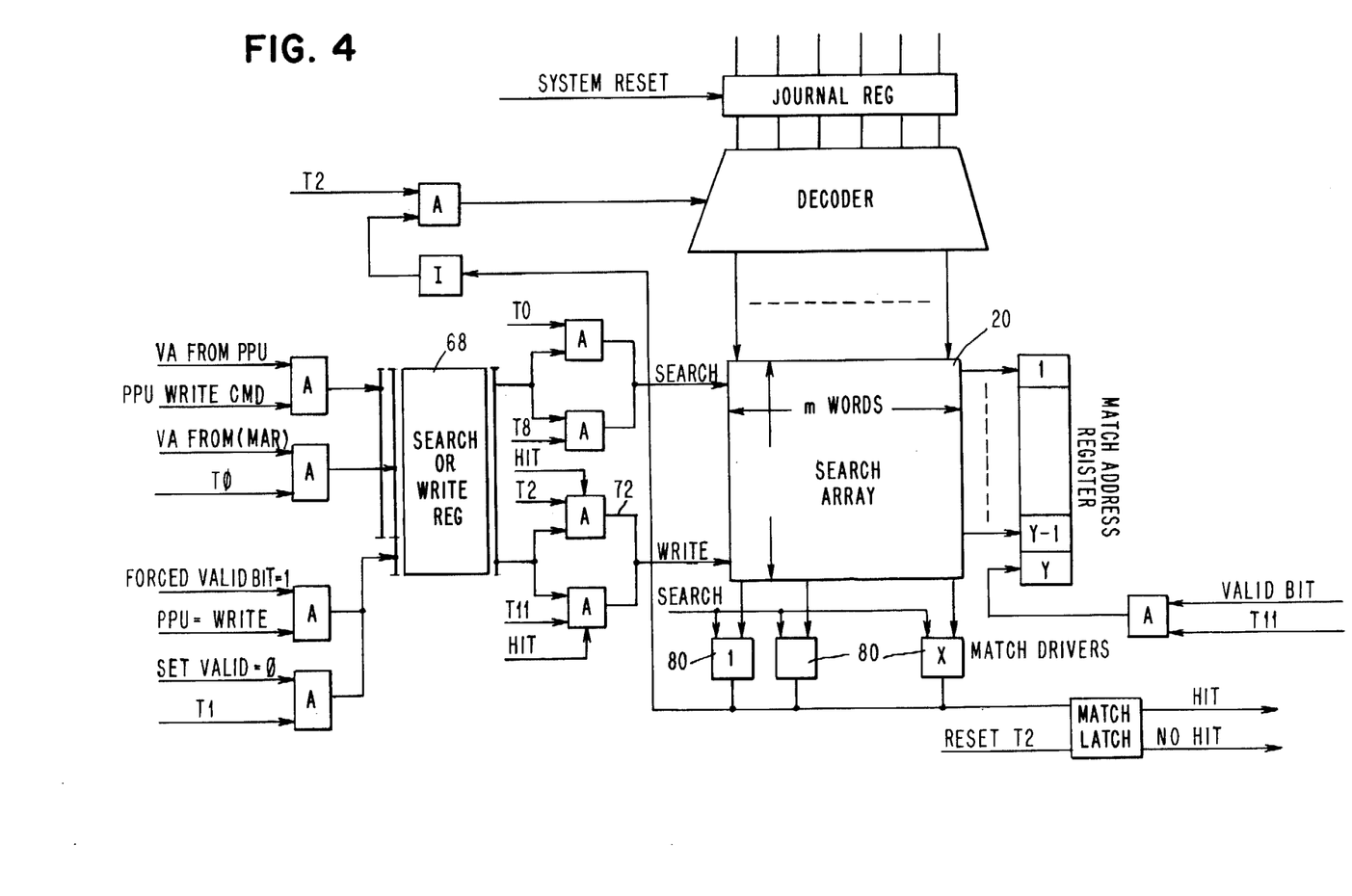
FIG. 4 is a schematic diagram of the journal directory shown in block diagram form in FIG. 2.

As shown in FIGS. 2 and 4, when data is to be written into the memory system, the PPU 1 supplies a write control signal to gate 66 to gate the output of the hash circuit 52 into the search address register 68 of the L1 journal 20a. The journal 20a is an associative memory. The search performed is an associative search comparing the virtual address with that of each of the virtual addresses stored in the journal. If the virtual address in the search address register matches one in the journal, the journal 20a provides a compare or hit signal indicating that the address is stored in the journal, in other words, the data at that address has been previously modified. However, if a no-compare situation exists, or in other words, no hit is scored, it indicates that the data in that address had not been previously changed. When this situation occurs an entry is made in both the journal 20a and the copyback data store 18a to indicate that the address now being modified. The position the virtual address is entered into the journal and the copyback store 18a is an indication of the order in which the change was made and as shall be seen later, the address in the journal and copyback store determines the order in which that change is copied back into the lower levels. For this purpose a counter referred to as the next free space counter 70 counts off each of the addresses of the journal 20a and CBDS 18a in sequence. When a no-hit signal is provided by the hit register of journal 20a in combination with the PPU write signal, the output of the counter 70 is fed through AND gates 72 to select any of the m words in the journal 20 and CBDS 18. Simultaneously the virtual address in the search register 68 is entered through AND gate 74 into the journal and the address and data from the PPU 10a are entered into the CBDS 18a at the location specified by the counter 70. Of course the change in data is also entered into the L1 store 14a.

Figure 5:
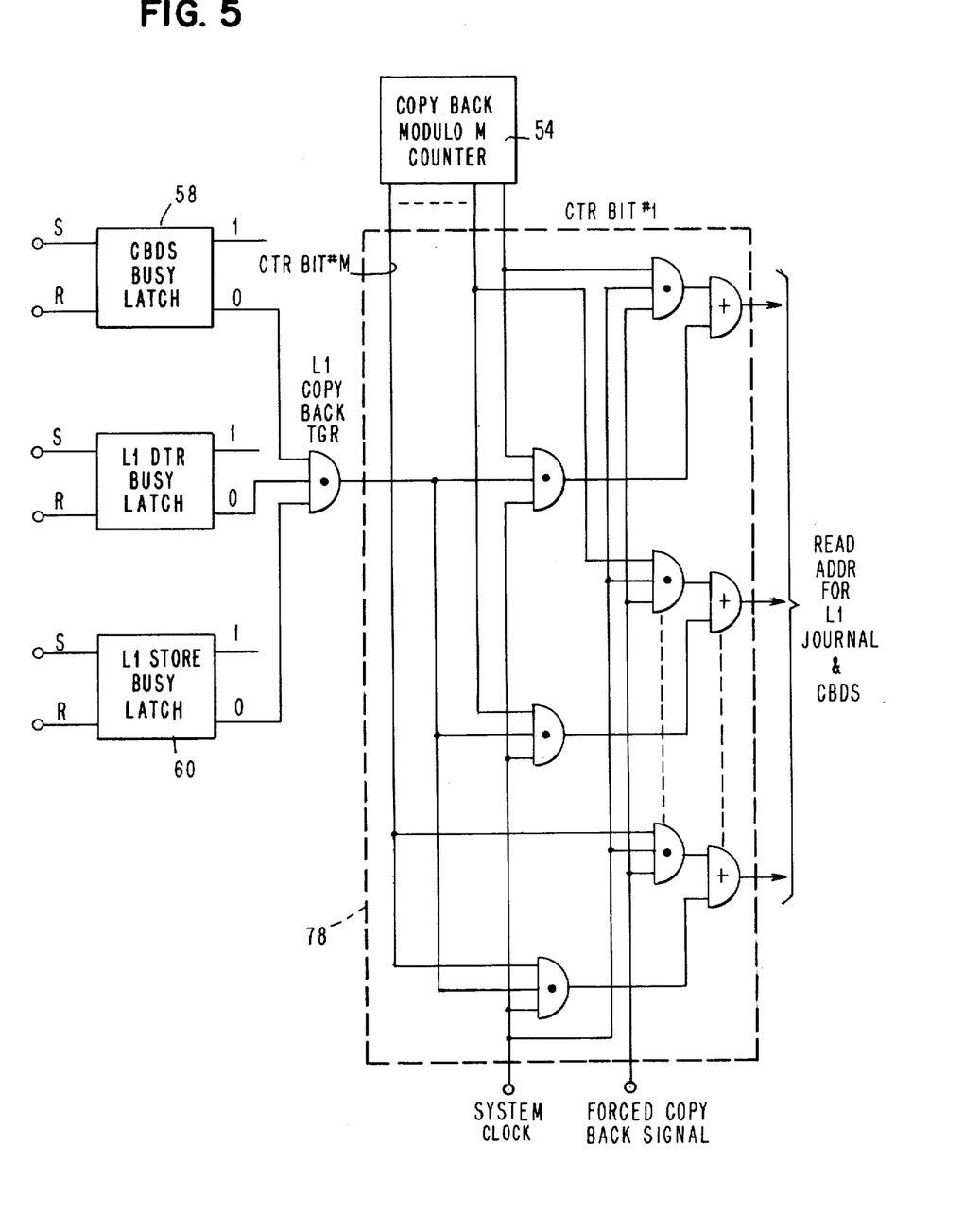
FIG. 5 is a schematic diagram of the circuitry for generating a copy back command signal for the memory system of FIG. 2.

When the journal entry is complete the counter is stepped to the next number in the addressing sequence by an entry completion signal T2. In this way each entry made in the journal and CBDS is made in sequence in which the change in the data was first requested by the programming processing unit 10a so that when the data is to be copied back it can be copied back in order in which the entries were made into the journal by merely accessing the addresses in the journal in their numerical order. This is accomplished with the copy back counter 76 which steps through the addresses of the journal 20a and CBDS 18a in order they were first placed in the journal and copies the changes back to the lower levels. This implies that regardless of the number of modifications data has undergone, the candidate for copy back is the data that was least recently first modified. This is the data whose first entry had the longest life in the journal 20a and CBDS 18a and has the highest probability that it will not be modified again by the processor 10a. The copy back counter 76 always lags the free space counter 70 and points to the next candidate for copy back from L1 to L2/3. Whenever the processor 10a is not modifying data in its L1 store 14 and L1 directory 16a is free, an L1 to L2/3 copy back cycle may be taken. When this occurs the circuits in FIG. 5 enter the contents of the copy back counter 54 into the SAR of CBDS to fetch the Virtual Address and 16 bytes of modified data. The copy back command is issued to the L2/3 copy back controller. (L2/3 journalling will be discussed in detail later on.) After the entry has been copied back from the L1 copy back store 18a into the L2/L3 data and copy back stores and notations of the changes in the data are duly noted in the L2/L3 journal 88, a timing signal T1 is applied to the copy back counter 54 to step the counter 54 to the next position. Then if conditions still exist for the copying back of data, the CBDS 18 is again accessed, and the data at the next address in the CBDS 18a is copied back into the data and copy back stores of the next level.

Besides storing virtual address the journal 18a stores what is called a valid bit. A valid bit is a bit that is turned on when entry is initially made into the journal. Referring to FIG. 4, if can be seen how a valid bit is entered in the search array of the journal directory 20a. When the PPU 10a issues a write command to write at some virtual address, the virtual address is hashed and loaded into the search/write register 68. The length of the search/write register is 1 bit greater than the hashed virtual address and when the virtual address is entered, the last or the Yth position in the search register is forced to a logical 1.

As pointed out previously the entire search array 20a is interrogated simultaneously. If the contents of the search/write register 68 matches bit for bit with one of the array words, one and only one of the array match drivers 80 will be turned on. Any one of the match drivers being turned on will provide a hit signal which signifies that the data had been changed previously and an entry has already been made in the journal 20. When none of the match drivers 80 is turned on a no-hit condition is indicated. This means that an entry must be made in the journal 20a and the CBDS 18a. For this purpose counter 70 is advanced to address the next available word in the array 18. At the same time, the write gate is conditioned such that the contents of the search/write registers are written into the location addressed by the counter.

Finally, when data is copied back the journal 20a must reflect the fact that the page in L1 data store 14a no longer differs from the copy in L2 data store 34. This is done at copy back time by placing the hit address in the search array into the match address latches MAR and setting the valid bit in the search/write register to invalid or logical zero. On the write portion of the cycle, the match address latches are used to address the search array.

The contents of the search/write register are written into the location addressed. The valid bit being turned off will prevent a compare on a virtual address search of the array the next time the array is searched. The timing signals T shown in this and other figures of the specification are signals generated by conventional clocking circuitry in the order of the number associated with the signal.

Two types of copy back are possible, copy back in accordance with the least recently first modified copy back algorithm and a forced copy back. A forced copy back is a copy back that does not occur in the order of the least recently first modified copy back algorithm. That is the algorithm set up by the stepping of the journal 20a through its addresses in sequence by the copy back counter 76. When a forced copy back takes place, valid bit is removed from the journal 20a just as it is during a regular copy back operation to indicate to the copy back mechanism that the data has been already copied back and should not be repeated.

Figure 6:
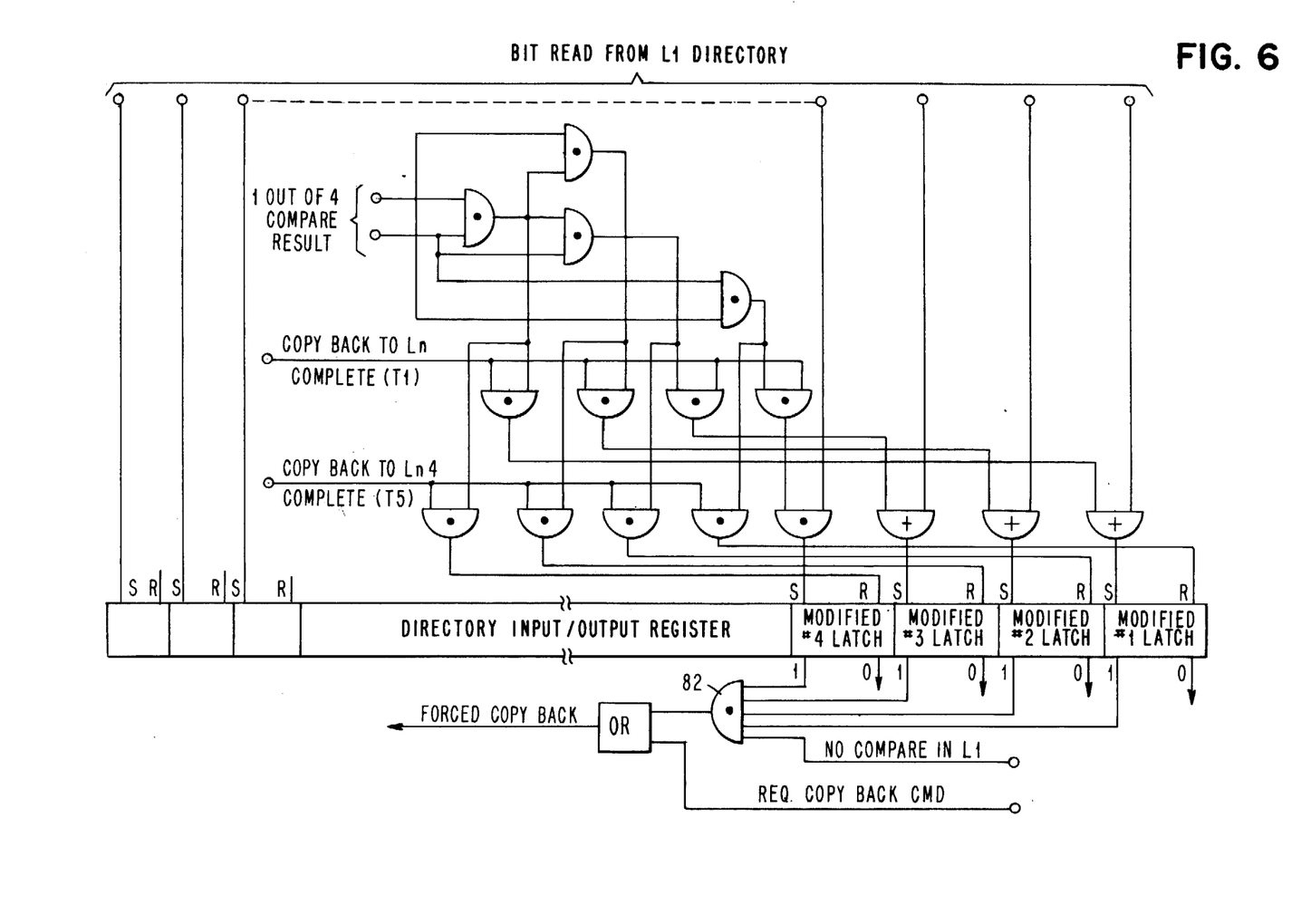
FIG. 6 is a block diagram showing details of the force copy back circuitry shown in FIG. 2.

A forced copy back takes place for a number of reasons. First of all it occurs when data is to be entered into a congruence class in which data at all the virtual addresses in the congruence class have been changed and the changes have not yet been copied back. To determine whether a forced copy back must be performed for this reason, the directory 16a contains four status bits, a status bit for each individual address in the congruence class. The status bits are set by the status bit update circuitry shown in detail in FIG. 6. Whenever data is either changed or copied back this circuitry changes the status bits to reflect the fact. The status bit circuitry also contains an AND circuit 82. When the output in the directory contains four ones indicating that data at all addresses in a particular congruence class have been changed and there is a no-compare signal indicating that the data is not stored anywhere at the level, a forced copy back signal is generated by ths AND circuit 82 when a new entry is mapped into that address by the hashing circuitry discussed previously.

A second reason for forcing copy back is overrunning the CBDS 18a and journal 20a. The CBDS and the journal have only 1/6th the positions of data store 14. Therefore a journal full counter 84 is used to ensure that the next free space in counter 70 does not overrun the copy back counter and start overlying entrys in the journal on CBDS that have not as of yet been copied back. The journal full register 84 is an up/down counter that keeps count of the number of the $m$ slots in the journal and the CBDS that are used and not copied back. When a certain percentage of these slots fall into this category the journal full counter issues a regenerate copy back command to the circuitry of FIG. 6 to initiate a copy back operation. For instance, it may be advantageous to issue copy back requests when the journal reaches a threshold of 90% capacity and continue copy back cycles until 60% capacity is reached.

The hardware for journalling and copy back at the L2/3 level is shown in FIG. 3. The directory look-aside table (DLAT) 60 is made from a high speed technology relative to the main storage directory (MSD) 56. The MSD shown is the same MSD for both the L2/3 page-up controller 22 and the L2/3 controller 24. The MSD is contained in L2/3 store. In addition, there exists an L2/3 journal 88 containing a list of all modifications made to the L2/3 level via copy back from L1 CBDS 18 or from source/sink into L2/3.

Finally, there exists in L2/3 storage two lists of pages reserved for copy back purposes called the copy back real address free list CBFL A and B. If the address of the modified data resides in a BSM in the A half of the system, a copy back page will be assigned from CBFL for the B half of the system and vice versa.

Assume that a copy back command is issued by the L1 copy back controller to the L2/3 copy back controller 22. The virtual address fetched from L1 CBDS 18a is bussed to the L2/3 controller 22b via the L1 CB address bus as the virtual address is hashed and the DLAT 60 searched. Assume a no compare situation in the DLAT. The MSD 56 is then searched, and a compare situation must exist since all pages resident in L2/3 level are pointed to by the MSD 56. The home real address of the page is implied by the entry location in the MSD 56 when a compare exists between the virtual address issued by L1 CBDS and the virtual address field in the MSD. If the Copy Back Real Address CBRA entries and the next free space pointer entry NFS PTR in the MSD are zero, it is implied that the first update to a line of the page at L2/3 relative to its copy at L4 is to take place. The virtual address and the HRA are read from the MSD and set into the DLAT 60 along with the contents of the next free space counter 92 (NFS CTR). Since it is the first modification, a CBRA assigned from the CBRA table is also set into the DLAT. Concurrently, the virtual address and the CBRA are set into the L2/3 journal 88 at the location pointed to by the NFS CTR 92 concatenated with the main storage address offset. Since the line of modified data in 11 CBDS is 16 bytes and the page size at L2/3 is 2KB, the low order 7 bits (D16 to D1024) must be decoded to determine which 16 bytes out of 128 lines in the 2K page is undergoing modification. The result of this bit code is also written into the L2/3 journal 88 in the area designated as recovery bit map. The function of the recovery bit map will be discussed later.

The implied HRA in MSD and the assigned CBRA are set in the L2/3 copy back queue of the L2/3 copy back controller. When the copy back queue is serviced, the 16 bytes of modified data in L1 CBDS are written into L2/3 HRA and CBRA.

Assume a copy back command issues to L2/3 level and a DLAT miss occurs but a valid CBRA entry is in the MSD 56. A valid CBRA entry implies the nth modification or change has been made to a page of data in L2/3 relative to the copy of this page in L4 level. Since this is the nth modification to a page, the CBRA has already been allocated. The virtual address, CBRA, and implied HRA are transferred from the MSD to the DLAT. Also, the CBRA and the HRA are set in the 12/3 copy back controller queue. When the copy back queue is serviced, the modified data in L1 CBDS 18a is written into L2/3 HRA and CBRA.

The next free space pointer field from MSD is set into the journal SAR. The vertical address CBRA and recovery bit map are fetched and saved. The valid bit is set to invalid on the store back cycle. The virtual address, CBRA, and recovery bit map are then restored at the location in the L2/3 journal 88 pointed to by the contents of the next free space counter 92. Hence, the journal list has been reordered. (Note also that the contents of the net free space counter were also stored in the DLAT 60 when the virtual address, CBRA, and HRA were transferred from the MSD 56 to the DLAT 60.)

On successive modifications, the journal is reordered so as to provide some degree of copy back filtering from L2/3 to L4 which is a much slower device. An LRU copy back algorithm would provide the highest degree of filtering in applications where modification rates to a given page is high. However, when slow storage devices are involved the implementation of LRU requires considerably more overhead in terms of hardware and time relative to the copy back algorithm to be described later.

The final case to consider in this section is when, upon a copy back command to L2/3 and DLAT compare exists. A DLAT compare always implies the nth modification to a page at the L2/3 level since the last update from L2/3 level to the L4 level. The HRA and CBRA are set in the L2/3 copy back controller queue. When the copy back queue is serviced, the modified data in L1 CBDS is written into L2/3 HRA and CBRA.

The reordering of the journal entry corresponding to the page copied back is identical to that previously described. The fourth and fifth levels of the store are magnetic and will be referred to as the disk and tape (Archival) levels, respectively. The fourth level contains disk devices 38 having multiple read/write stations 164. Each disc device 38 contains containing four actuators A, B, C and D per spindle each actuator accessing an area of the disc device or in other words a dedicated group of cylinders.

The Archival or fifth level of the store is a cartridge tape device 40 also in having multiple read/write stations 164 capble of reading a tape 100 n cartridge form. The devices 38 and 40 are each attached through their read/write stations 164 to a controller 46 or 48 via a serial loop interface 42 or 44. Multiple disk and tape units 38 and 40 are attached on each loop. For availability purposes, the second controller 48 is attached to the same disk and tape units as the first controller 46 by the loop 42.

Data at the disk level is recorded in segments containing one or more pages. When space is allocated on disk for a given segment size, the physical address of that allocated space is referred to as the "Home Address" of that segment for as long as the segment resides at the disk level. The disk copy back area is on a spindle 38 other than that which the home address is recorded on. This allows for recovery if the home address spindle fails. FIG. 1 shows how the home address data and its associated copy back data resides on a different spindle. All cylinders of actuator A of spindle 38a are dedicated and referred to as copy back area B. Data recorded here is for new and modified data to home address areas for the spindles of the B half of the system. The second copy back area A is on actuator A of spindle 38b.

All writes coming down from the L2/L3 level of the store are either new or modified pages to the disk level. Every write to the disk is recorded twice. The page in the home address area is overlayed or allocated, depending on whether it is new or modified. The same page will also be recorded in the copy back area.

Figure 7:
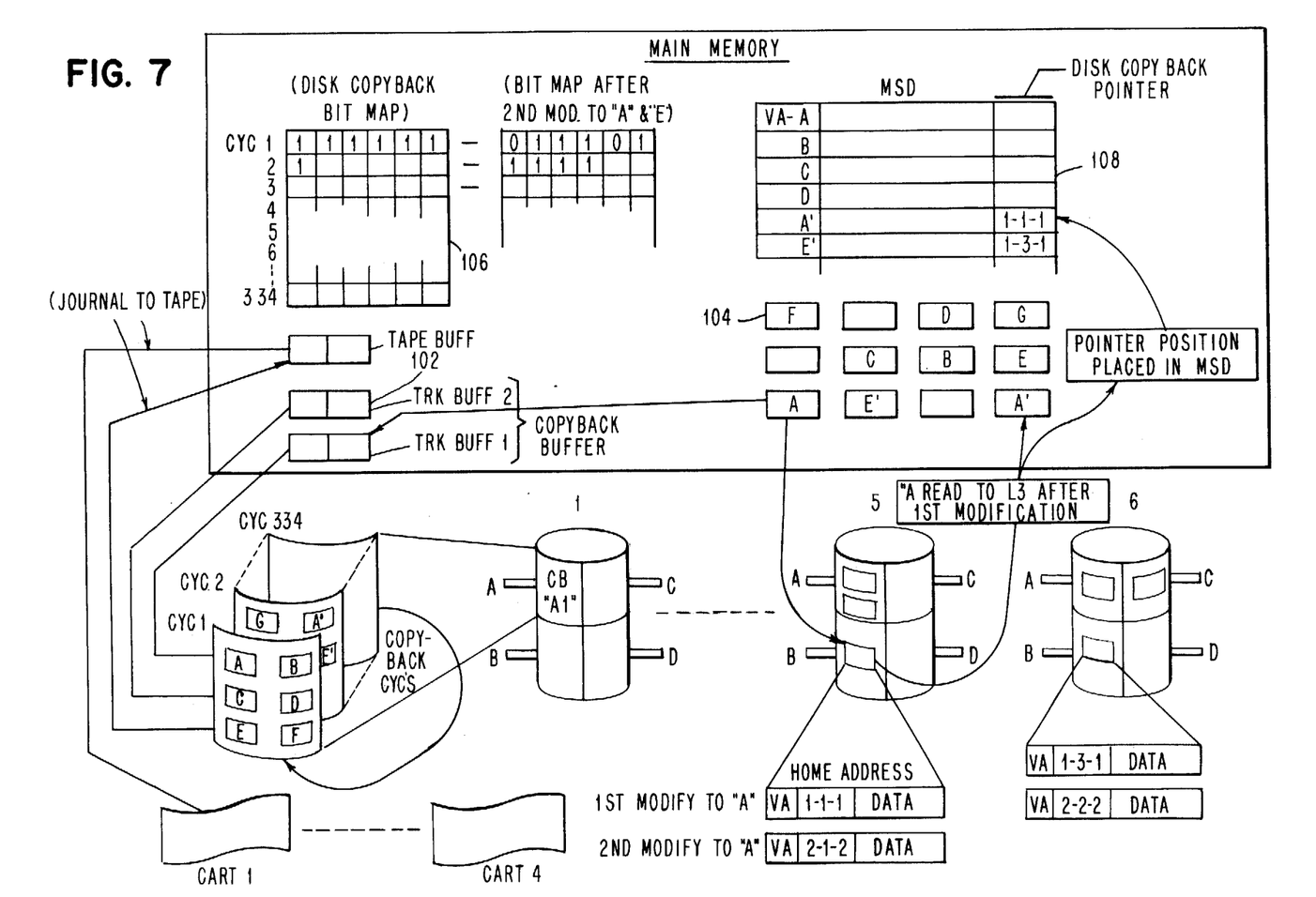
FIG. 7 is a schematic diagram of the third, fourth and fifth levels of the memory hierarchial system shown in FIG. 1.

Referring to FIG. 7, the copy back actuator is required to sustain a write rate equal to the sum of all writes to all other spindles without losing performance. To meet this requirement, a buffer area 102 is provided for the CB store. As the writes to the HA area 104 are being executed, the pages are also buffered in the main memory or in the L2/L3 data store. Enough buffering is provided so that the CB actuator can write a track's worth or one disc revolution of data at a time. Actually two such buffers are provided. As the first buffer is unloaded (1 disk revolution), the second can be loaded. Th pages are placed in the buffers in the order they come from L2/3 to the L4 level while they are being recorded at the home address. When the buffer is full, L4 copy back store starts recording data stored in the buffer on track 1, cylinder 1, then track 2 of cylinder 1, track 3, etc. When the last track of cylinder 1 is recorded, the actuator moves to cylinder 2, etc. Because we are recording in this sequential fashion, the physical address that the 2K page will be recorded at on disk is predetermined when it is placed in the track buffer. As mentioned above, all data copied back to disk comes from the L2/3 home address area. For ease of representation, the capacity of the copy back cylinders are shown with a capacity of six pages. The example shows three tracks per cylinder and two pages per track.

A bit map 106 is provided to allocate and reclaim space in the copy back area. The bit map resides in main memory and contains a bit for every page slot in the copy back area. Each cylinder (6 pages) is represented by six bits in the map. The first row of bits in the map is for cylinder 1. The first bit is representative of track 1, record 1 and the last bit for track 3, record 2. At the time a page is placed in the track buffer, the appropriate bit in the bit map is set to a one, indicating that it is used.

The two track buffers mentioned above, therefore, will each contain two pages (track buffer 1 and 2). In the example we show seven pages belonging to seven different segments that are to be copied back to the disk level. The pages are lettered A thru G and represent the virtual address of these seven pages.

When the L2/3 copy back controller determines that a page is to be copied back to the disk, it issues a copy back command and sends the virtual address to the L4/5 controller. The L4/5 controller will address the main store directory (MSD) with the virtual address. Status in the MSD indicates if this page is new or modified to the disk level. If new, the L4/5 controller must allocate space for that entire segment. The extent (size) of the segment must be known in order to allocate sufficient space on the disk. The extent information is available by examining the segment control block which contains all pertinent information about that segment. Any means for allocating space on the disk is sufficient for this example. Now that the physical space (HA) for this segment has been made available, an entry is made in the disk directory indicating location, size, etc., for that segment.

If the MSD status indicates the page is not new (modified), the disk directory is searched to determine the home address. The home address is accessed, and the 2K page is overlayed with the modified 2K block from the L2/L3 level.

Each 2K block written to the home address area of the disk is also placed in the copy back buffer area located in main store. Assume virtual address A and B are the first modified pages to be copied back. Virtual address A is placed in track buffer 1 and because it will be recorded in cylinder 1, track 1, record 1, the first bit in the cylinder 1 bit map is set to a 1. Virtual address A may now be written to its disk home address. When B is signalled to be copied back, the same routine takes place, except the second bit of the cylinder 1 bit map is set to a one.

Track buffer one is full at ths time (contains A and B). The L4/5 controller initiates a write to the copy back actuator and records pages A and B on track 1 of cylinder 1. During this time that the copy back actuator is recording A and B, copy back commands are initiated for virtual address C and D. They are placed in track buffer 2 as buffer 1 is being unloaded. While C and D are being written, E and F are placed in Buffer 1. After E and F are recorded on the last track of cylinder 1, the actuator moves to track 2.

Figure 8:
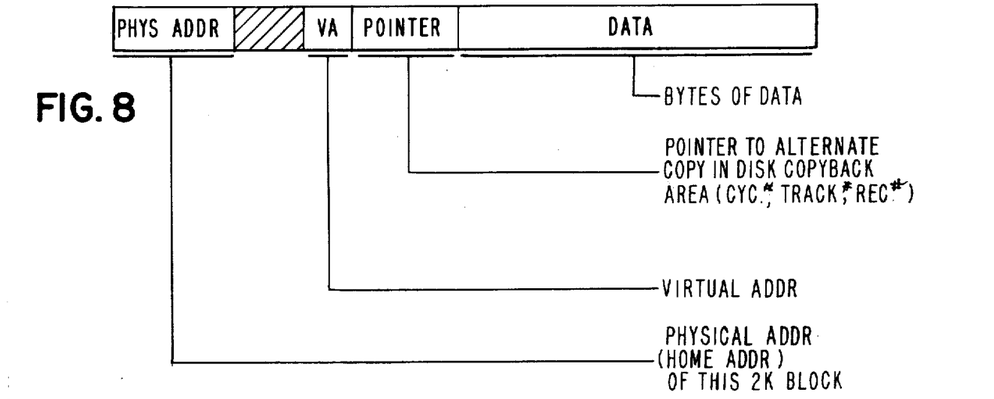
FIG. 8 is a sketch showing the format for addressing the fourth and fifth levels.

At this time, let us look at the data recorded in the home address area. FIG. 8 shows detailed information contained in a block. Each block of data (in copy back area, also) contains the physical address (cylinder #, track #, record #). The physical address is followed by a gap which is followed by the data field. The data field contains information other than the actual bytes of data. The virtual address is followed by a pointer (3 bytes) that indicates the alternate copy of this page in the L4 copy back area. This copy back address was determined at the time the page was placed in the track buffer which was prior to the home address writing. Referring back to FIG. 7 the pointer is recorded with the data for virtual address A on spindle 5. The 1-1-1 notation denotes the physical address of the alternate copy in copy back store (cylinder 1, track 1, record 1).

These pointers are not used unless more than one modification is made to the same page. During a cycle thru the copy back store, sequentially moving from cylinder one thru 334, a given page may be modified more than once. With each modification, a new copy back address is assigned, and therefore the previous modification becomes invalid by making the appropriate alteration to the bit map. Modification of the bit map (changing the bit from 1 to 0), is to indicate to the system that this modification is not be journaled to the next level of the store on the next pass thru the copy back area. The bit map modification is performed as follows. Let us assume a read command to virtual address A following its first modification to the disk. When A is read into main memory for the second time, we will identify it by calling it A'. A' is assigned an MSD entry, and the copy back pointer (1-1-1) is also entered into the MSD. The nest time A' is modified, the MSD is addressed, and the pointer is read out. This pointer indicates the appropriate bit in the map that is to be changed to a zero. In this case, it is the first bit of the cylinder 1 bit map.

The copy back actuator is now sitting on cylinder 2. When A' is copied back, let us assume it will be recorded on cylinder 2, track 1, record 2, and the home address location will indicate (2-1-2) in the pointer field. This pointer indicates the location of the latest modification of that block on the copy back spindle. FIG. 7 also shows two modifications for block E. The first modification in the copy back was recorded at cylinder 1, track 3, record 1. The second modification resides at (2-2-2). As we sequentially write thru the copy back area, old copies of blocks that are modified more than once are deleted from the previous cylinders. There is automatic LRU (least recently used) algorithm built into this technique.

Data to be journaled to the tape device will come from the copy back area of the disk. The LRU algorithm built into the disk copy back mechanism determines the page that will be journaled to the tape. Journaling to the tape begins after the first cycle thru the disk copy back area (i.e., the copy back actuator has written the last track of cylinder 334 and returns to cylinder 1). With the actuator on cylinder 1, the first step is to determine which 2K page will be journaled. This is accomplished by examining the bit map for cylinder 1. Those 2K pages whose associated bits in the cylinder 1 bit map are logical ones are the pages to be journaled. These pages are read starting at track 1 and placed in a tape buffer in main memory. The pages are written to tape from the tape buffer area. Track 1 is now free for other pages journaled from L3. As each sequential track is unloaded to the tape buffer, it is replaced with journaled data from L3.

All data (for a given segment) journaled or copied back to tape is identified by an entry in the tape directory that resides at the disk level. The crtridge that the journaled data is recorded on is a separate cartridge from that which the data at the HA is recorded on. We, therefore, end up with two copies of the segments that migrate to the tape level. Data to be out-paged from the disk level home address is determined by an LRU algorithm. All segments are time-stamped, and the oldest pages (not referenced) are out-paged. Because the home address area is much larger than the copy back area, data will stay at the home address longer than it will at the copy back area.

The tape device may have two or more read/write stations (we will assume 4). When data is journaled to tape, it may be recorded on any one of the cartridges that are mounted. The most efficient way to record data at the tape level, as in the disk level, is to record sequentially. If one of the two cartridges that the segment is recorded on fails, the segment can be reconstructed from the other cartridge.

Recovery, reconfiguration, and data reconstruction from any directory or store failure is via journaling and copy back. Error detection is a prerequisite for any error recovery routine. Therefore, each directory and store will have as a minimum a SEC/DED (Single Error Correction, Double Error Detection) unit. Use of more powerful error correction codes are a function of the failure modes of the memory technologies used.

Any detected error beyond the correction capability of the unit at that store or directory is a trigger for error recovery. Assume first that the store at level N is in error and the directory good. The store address in error is logged out, and the directory status bits are inspected to determine if the data has been modified. If the data has not bee modified, the directory entry is marked invalid for that physical location in storage is disallow its future use. Since the data has not bee modified, a current copy exists at level N-1 and may be paged up to level N.

If the store fails and the directory is good, but the directory indicates that the data has been modified the journal at level N-1 is searched with the virtual address issued by the requesting processor. A copy back from N-1 and N is forced, thereby updating the copy at level N. The reconstructed data at level N is then pages up to level N-1.

If the directory fails, then the status of the data being accessed is not known. The directory entry is marked invalid for future use, and the physical address of the location in error logged out. As described in the previous paragraph, the journal is searched, a copy back forced, and the reconstructed data from level N is paged up to a new level N-1 location.

The MSD is used to recover from journal failures as follows. The MSD is searched sequential Whenever a valid CBRA is encountered, forced copy back must be taken. However, since the journal recovery bit map may be lost, copy back from L2/3 to L4 is from L2/3 home address to L4 home address. Once copy back of all modified data is complete, the copy back controller is configured out of the system since its journal is defective.

From the description of the preferred embodiment of the invention one skilled in the art will recognize a variety of applications for the invention and appropriate modifications within the scope of the claims.

What is claimed is:

1. In a multi-level hierarchial memory system made up of a lowest level with a first data store means for storing data for the memory system and a plurality of sequentially higher levels each level with its own first data store means for storing data at that level which is a portion of the data contained in the first data store means at the next lower level in the hierarchy and for also storing changes of addition or modification to units of said portion of the data made by computer instruction from a processing unit, an improvement in the means of copying back from any given level of the sequentially higher levels into the next lower level said changes stored at said given level comprising:

a second data store means at said any given level that is coupled to the processing unit for the purpose of storing a duplicate copy of only those units of the data at said any given level that contain said changes to be copied back down to lower levels, said second data store means having the capacity to store only a small portion of the data units capable of being stored in the first data store means of said any given level;

a journal means coupled to the processing unit for recording the locations of data units at said any given level in the order in which data units stored in the second data store means at said given level were first altered at that given level by one of said changes that has not been copied back into any lower level;

copyback means coupled to the next lower level in the hierarchy and to the journal means for copying back said units of data at said any given level that contains said changes made in the data at said given level into the next lower level in the hierarchy in said order recorded in the journal means;

counting means at said any given level for counting the number of data units at said any given level that have yet to be copied back to the next lower level at any given moment and, forced copy back means coupled to the copyback means for starting the copy back means to copy back changes in the next lower level of the hierarchy when the count in the counting means reaches a count which is within a preselected number of counts of the data unit capacity of the second data store at said any given level so that the number of data units at said any given level that have yet to be copied back will not exceed the data unit capacity of the second data store.

2. The hierarchial memory system of claim 1 wherein said journal means includes:

a different location for every location in the second data store means;

entry means for stepping through the locations of the journal means in sequence for selection of the location in the journal for the next entry of the location of the data units to be made into the journal means; and copy means for stepping through the locations of the journal means in sequence for selection of the next entry of the location of the data unit in the journal to be copied back, and wherein said counting means has an incrementing input coupled to the entry means for increasing the count of the counter one count each time the entry means makes a selection and has decrementing means coupled to said copy means for decreasing the count of the counter one count each time the copy means makes a selection to thereby keep count of how many of the data units have yet to be copied back to the next lower level.

3. The hierarchial memory system of claim 2 wherein: said forced copy back means is coupled to the counting means for detection by the forced copy back means of the count of the counter at two levels, the higher of the two levels to start forcing copying back of data and the lower of the two levels to terminate forcing of copy of data.

4. The hierarchial memory system of claim 3 wherein: said forced copy back means includes a latch which is set by the high count and rest by the low count of the counter, and means responsive to said latch to force copying back of entries when the latch is set and end copying back of entries where latch is reset.

* * * * *